United States Patent
Mishra et al.

(10) Patent No.: US 12,093,261 B2
(45) Date of Patent: Sep. 17, 2024

(54) STORAGE FORMATS FOR IN-MEMORY CACHES

(71) Applicant: Oracle International Corporation, Redwood Shores, CA (US)

(72) Inventors: Aurosish Mishra, Belmont, CA (US); Shasank K. Chavan, Menlo Park, CA (US); Vinita Subramanian, Campbell, CA (US); Ekrem S. C. Soylemez, Lexington, MA (US); Adam Kociubes, Bedford, MA (US); Eugene Karichkin, Fremont, CA (US); Garret F. Swart, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 453 days.

(21) Appl. No.: 15/943,335

(22) Filed: Apr. 2, 2018

(65) Prior Publication Data

US 2019/0102391 A1 Apr. 4, 2019

Related U.S. Application Data

(60) Provisional application No. 62/565,832, filed on Sep. 29, 2017.

(51) Int. Cl.
*G06F 16/24* (2019.01)
*G06F 16/172* (2019.01)
(Continued)

(52) U.S. Cl.
CPC ...... *G06F 16/24552* (2019.01); *G06F 16/172* (2019.01); *G06F 16/221* (2019.01); *G06F 16/2455* (2019.01); *G06F 16/24553* (2019.01)

(58) Field of Classification Search
None
See application file for complete search history.

(56) References Cited

U.S. PATENT DOCUMENTS

| | | | |
|---|---|---|---|
| 4,782,325 A | 11/1988 | Jeppsson et al. | |
| 5,742,792 A | 4/1998 | Yanai et al. | |

(Continued)

FOREIGN PATENT DOCUMENTS

| | | |
|---|---|---|
| EP | 2 608 070 A1 | 6/2013 |
| GB | 1 332 631 A | 10/1973 |
| WO | WO2007/078444 A1 | 7/2007 |

OTHER PUBLICATIONS

Sameer Agarwal; Knowing When You're Wrong: Building Fast and Reliable Approximate Query Processing Systems;2014; pp. 481-492 (Year: 2014).*

(Continued)

*Primary Examiner* — Albert M Phillips, III
*Assistant Examiner* — Jermaine A Mincey
(74) *Attorney, Agent, or Firm* — Hickman Becker Bingham Ledesma LLP

(57) ABSTRACT

Techniques related to cache storage formats are disclosed. In some embodiments, a set of values is stored in a cache as a set of first representations and a set of second representations. For example, the set of first representations may be a set of hardware-level representations, and the set of second representations may be a set of non-hardware-level representations. Responsive to receiving a query to be executed over the set of values, a determination is made as to whether or not it would be more efficient to execute the query over the set of first representations than to execute the query over the set of second representations. If the determination indicates that it would be more efficient to execute the query over the set of first representations than to execute the query over the set of second representations, the query is executed over the set of first representations.

28 Claims, 8 Drawing Sheets

(51) Int. Cl.
     *G06F 16/22*     (2019.01)
     *G06F 16/2455*   (2019.01)

(56) References Cited

U.S. PATENT DOCUMENTS

| | | | |
|---|---|---|---|
| 5,778,430 | A | 7/1998 | Ish et al. |
| 5,870,759 | A | 2/1999 | Bauer et al. |
| 6,009,432 | A | 12/1999 | Tarin |
| 7,149,769 | B2 | 12/2006 | Lubbers et al. |
| 8,433,684 | B2 | 4/2013 | Munoz |
| 8,856,484 | B2 | 10/2014 | Ben-Tsion et al. |
| 9,292,564 | B2 | 3/2016 | Kamp et al. |
| 2003/0145190 | A1* | 7/2003 | Faraboschi ............ G06F 9/3842 712/E9.05 |
| 2005/0055380 | A1 | 3/2005 | Thompson et al. |
| 2005/0071331 | A1* | 3/2005 | Gao .................. G06F 16/24547 |
| 2005/0165798 | A1 | 7/2005 | Cherkauer et al. |
| 2006/0173833 | A1 | 8/2006 | Purcell et al. |
| 2007/0156957 | A1 | 7/2007 | MacHardy et al. |
| 2008/0059492 | A1 | 3/2008 | Tarin |
| 2008/0256250 | A1 | 10/2008 | Wakefield et al. |
| 2008/0281784 | A1 | 11/2008 | Zane et al. |
| 2008/0281865 | A1 | 11/2008 | Price et al. |
| 2009/0307290 | A1 | 12/2009 | Barsness et al. |
| 2010/0235335 | A1 | 9/2010 | Heman et al. |
| 2010/0250549 | A1 | 9/2010 | Muller et al. |
| 2011/0029569 | A1 | 2/2011 | Ganesh et al. |
| 2011/0138123 | A1 | 6/2011 | Gurajada et al. |
| 2012/0017146 | A1* | 1/2012 | Travieso ................. G06F 40/58 715/265 |
| 2012/0173515 | A1 | 7/2012 | Jeong et al. |
| 2012/0323971 | A1 | 12/2012 | Pasupuleti |
| 2013/0185703 | A1* | 7/2013 | Davis ...................... G06F 8/447 717/140 |
| 2014/0040218 | A1 | 2/2014 | Kimura et al. |
| 2014/0075493 | A1 | 3/2014 | Krishnan et al. |
| 2014/0280034 | A1* | 9/2014 | Harris ................ G06F 16/2453 707/718 |
| 2014/0317084 | A1* | 10/2014 | Chaudhry ......... G06F 16/24552 707/713 |
| 2015/0088811 | A1 | 3/2015 | Hase et al. |
| 2015/0088822 | A1 | 3/2015 | Raja et al. |
| 2015/0088824 | A1 | 3/2015 | Kamp et al. |
| 2015/0088830 | A1 | 3/2015 | Kamp et al. |
| 2015/0088926 | A1 | 3/2015 | Chavan et al. |
| 2015/0089125 | A1 | 3/2015 | Mukherjee et al. |
| 2015/0089134 | A1 | 3/2015 | Mukherjee et al. |
| 2017/0280434 | A1* | 9/2017 | Begeja .................... H04L 67/32 |
| 2018/0011893 | A1 | 1/2018 | Kimura |
| 2018/0089261 | A1* | 3/2018 | Li ....................... G06F 16/2453 |
| 2019/0087457 | A1* | 3/2019 | Bellamkonda .... G06F 16/24553 |

OTHER PUBLICATIONS

U.S. Appl. No. 14/337,179, filed 074/21/2014, Notice of Allowance, Jul. 29, 2015.
U.S. Appl. No. 14/337,179, filed Jul. 21, 2014, Office Action, Dec. 29, 2014.
U.S. Appl. No. 14/337,179, filed Jul. 21, 2014, Notice of Allowance, Nov. 3, 2015.
U.S. Appl. No. 14/337,179, filed Jul. 21, 2014, Interview Summary, Jun. 17, 2015.
U.S. Appl. No. 14/337,179, filed Jul. 21, 2014, Final Office Action, Apr. 10, 2015.
Shao et al., "Clotho: Decoupling Memory Page Layout from Storage Organization", Proceedings of the 30th VLDB Conference, Toronto, Canada, 2004, 12 pages.
Schaffner et al., "A Hybrid Row-Column OLTP Database Architecture for Operational Reporting", dated Aug. 24, 2008, 14 pages.
Ramamurthy, Ravishankar, "A Case for Fractured Mirrors" Proceedings of the 28th VLDB Conference, dated, 2002, 12 pages.
Phipps, Colin:, "Mapping Deflated Files", Internet Article, dated Jan. 6, 2013, http://zsync.moria.org.uk/paper/ch03s02.html, 3 pages.
Nirmesh, Malviya, "Recovery Algorithms for In-Memory OLTP Databases", Master of Science Thesis, dated Jul. 1, 2012, 66 pages.
Khalid Sayood:, "Introduction to data Compression", Morgan Kaufmann Publisher, dated Dec. 1996, 4 pages.
Farber et al., "SAP HANA Database—Data Management for Modern Business Applications", SIGMOD Record, dated Decmeber 2011, vol. 40, No. 4, 8 pages.

* cited by examiner

FIG. 1

| DECIMAL REPRESENTATIONS 100 |
|---|
| 123.45 |
| 67,890 |
| 10,111,213.1415161718 |

↓

LOW-COMPUTATION FORMAT 102 →

| MANTISSA 104 | SCALE 106 |
|---|---|
| 01 17 2d | -1 |
| 43 59 | 0.5 |
| 0a 0b 0c 0d 0e 0f 10 11 12 | -5 |

FIG. 2

HIGH-COMPUTATION FORMAT 200

| MANTISSA 202 | SCALE 204 |
|---|---|
| 0000 0000 0000 0000 0000 0001 0001 1111 0110 1101 1110 1111 0001 1001 0000 0000 | -5 |
| 0000 0000 0000 0010 0110 1001 0111 0100 1011 1001 0101 0110 1000 0000 0000 0000 | -5 |
| 0000 0001 0110 0111 0011 1000 1111 0010 1010 0011 0111 1011 1011 0111 0110 | -5 |

| DECIMAL REPRESENTATIONS 100 |
|---|
| 123.45 |
| 67,890 |
| 10,111,213.1415161718 |

STORAGE FORMATS FOR IN-MEMORY CACHES

CROSS-REFERENCE TO RELATED APPLICATIONS; BENEFIT CLAIM

This application claims the benefit of Provisional Application 62/565,832, filed Sep. 29, 2017, the entire contents of which is hereby incorporated by reference as if fully set forth herein, under 35 U.S.C. § 119(e).

TECHNICAL FIELD

Embodiments are generally related to information storage and retrieval technology. More specifically, embodiments are related to cache storage formats.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Cached Database Data

For efficient data access, a database system often maintains a cache of database data. The cache is typically maintained in volatile memory, such as main memory or random-access memory (RAM), which enables faster data access than many forms of non-volatile memory, such as magnetic disk memory. However, in some implementations, the cache can be maintained in non-volatile memory, such as non-volatile RAM.

Database data may be stored in a cache based on any number of various cache population and/or repopulation policies. For example, the database data may be eager-loaded and/or lazy-loaded into the cache.

Columnar Database Data

Database data may be cached using a storage format that enables efficient evaluation of database queries. Examples of such formats include the "column-major" format. In column-major format, a column for a subset (e.g., some or all) of rows in a database table are stored contiguously within a memory address space. Contiguously storing column values enables faster processing of the column values, because the column values can be accessed more quickly.

Cached database data stored in column-major format is referred to herein as columnar database data. Columnar database data can be stored in structures referred to herein as In-Memory Compression Units (IMCUs). An IMCU stores data for one or more columns. IMCUs are described in U.S. application Ser. No. 14/337,179, *Mirroring, In Memory, Data From Disk To Improve Query Performance*, filed on Jul. 21, 2014 by Jesse Kamp, et al. and issued on Mar. 22, 2016 as U.S. Pat. No. 9,292,564, the entire contents of which are incorporated herein by reference.

Each IMCU has one or more Column Compression Units (CUs). A CU stores data for a single column. CUs can be implemented as structures referred to herein as column vectors. Thus, a column vector stores one or more column values.

Application-Implemented Numbers

Columnar database data may include numeric values. To maintain the numeric values with a high degree of precision while minimizing memory consumption, the numeric values are often stored as application-implemented numbers, which are application-level representations of the numeric values. If processed natively, an application-level representation of a number will not denote the value of the number. As used herein, native processing refers to any processing that is performed in the CPU's instruction set rather than in higher-level code, such as that used in applications. In contrast, when interpreted by an application, the value of the number is denoted by the application-level representation. Examples of application-level representations include values of the NUMBER datatype supported by the relational database management system (RDBMS) technology provided by ORACLE Corporation of Redwood Shores, California.

Referring to FIG. 1, some example application-level representations of numeric values are provided. Decimal representations 100 are converted into application-level representations that are stored according to format 102. For reasons that will be provided below, format 102 is referred to as a "low-computation format" or "LCF" for short. In format 102, each application-level representation has two components—mantissa 104 and scale 106.

Mantissa 104 corresponds to the significant decimal digits of a numeric value. To illustrate, for the number "123.45", mantissa 104 comprises the decimal digits "1" through "5". The significant decimal digits can be divided into groups, each group having n decimal digits that can be stored using a predetermined amount of data. In the example of FIG. 1, each pair of adjacent decimal digits is stored as a byte. To illustrate, the decimal digits "1" through "5" are grouped as "1", "23", and "45", which are respectively stored as the hexadecimal byte values "01", "17", and "2d". It should be appreciated that hexadecimal values are used in FIG. 1 solely for the purpose of providing a clear example and that the use of hexadecimal values is not critical for the depicted implementation.

Scale 106 specifies how many decimal places to move the decimal point to derive the numeric value from mantissa 104. For example, the number "123.45" has a scale of "−1", which indicates that the decimal point is moved one base-100 decimal place to the left to derive "123.45" from the mantissa "12345". Positive scale values are also possible. For example, the number "67,890" has a scale of "0.5", which indicates that the decimal point is moved half a base-100 decimal place to the right to derive "67,890" from the mantissa "6,789".

Application-level representations of data are optimal for operations that involve little or no computation. Such operations are referred to herein as "low-computation" operations, which include projection operations and scan operations. However, for reasons described below, application-level representations of data are suboptimal for operations that involve a significant amount of computation. Such operations are referred to herein as "high-computation" operations, which include arithmetic operations.

One reason why application-level representations are suboptimal for high-computation operations is because performing such operations typically involve a conversion, at runtime, into a format that is compatible with native processing. For example, the hexadecimal byte values "01 17 2d" denote the decimal value "71,469" instead of the decimal value "12,345". Thus, the hexadecimal byte values "01 17 2d" would be converted into the hexadecimal byte values "30 39" prior to performing arithmetic operations.

Another reason why application-level representations are suboptimal for high-computation operations is because application-level representations can vary in length depending on the number being represented. In the example of FIG. 1, "123.45" has a three-byte mantissa, whereas "67,890" has a two-byte mantissa. This can be problematic for parallel processing techniques, such as single instruction, multiple data (SIMD), that involve concurrently storing multiple data units of uniform length into a CPU register.

Thus, what is needed are techniques that enable efficient performance of both low-computation and high-computation operations on cached database data.

BRIEF DESCRIPTION OF THE DRAWINGS

In the drawings:

FIG. 1 depicts an example cache storage format.

FIG. 2 depicts another example cache storage format.

Figure 3:
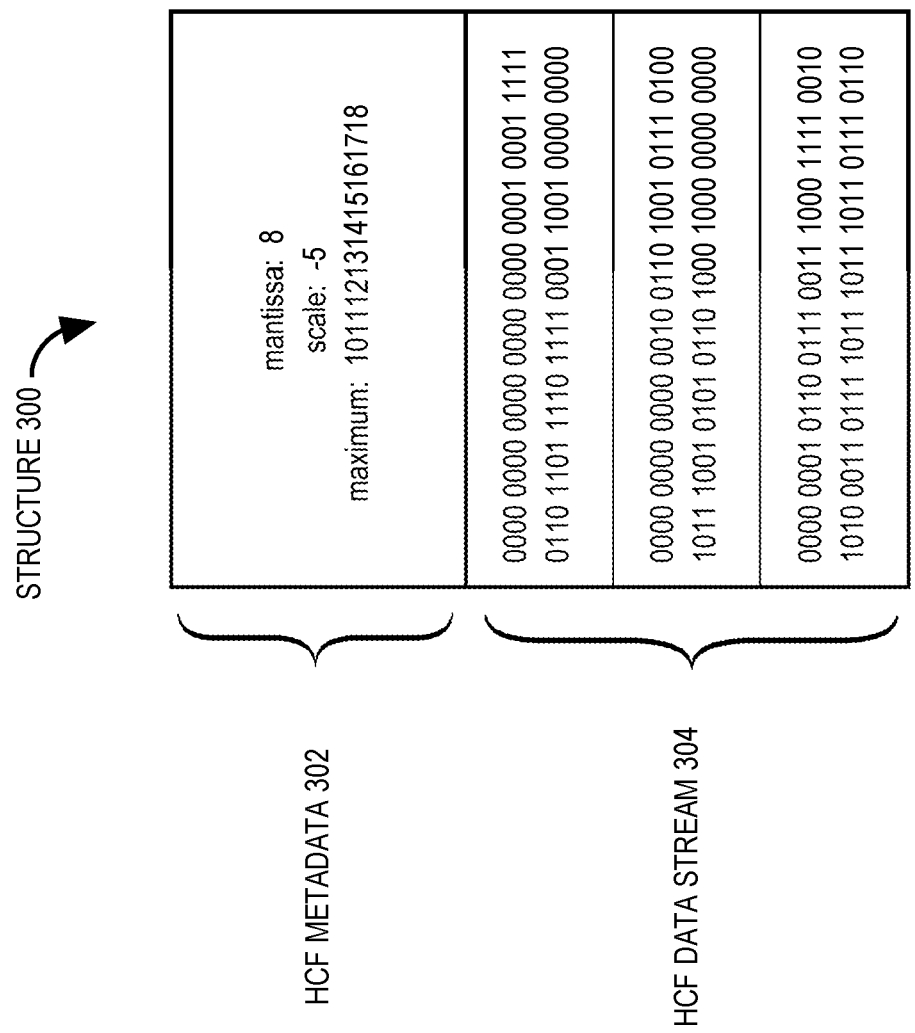
FIG. 3 depicts an example structure for compactly storing data in a cache storage format.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" are used to differentiate elements and do not necessarily indicate any particular order.

INTRODUCTION

To enable efficient performance of any operation regardless of how much computation is involved, the same data can be cached according to a plurality of different formats. For example, at any given time, a set of numeric values may be stored as both (a) a set of application-level representations that are optimal for low-computation operations and (b) as a set of hardware-level representations that are optimal for high-computation operations. Unlike an application-level representation, a hardware-level representation of a number denotes the value of the number even when processed natively.

Responsive to receiving a query, the format that is optimal for executing the query may be selected. For example, upon receiving a query involving an arithmetic operation, the database system may make a runtime decision to execute the query over the set of hardware-level representations rather than over the set of application-level representations.

To free memory, data cached in the colder or unused format(s) can be evicted. As used herein, "cold" data is data that has not been accessed recently. For example, if most of the queries received within a certain time period involved arithmetic operations, then the database system may make a runtime decision to evict the set of application-level representations from the cache.

Native Processing Numbers

As mentioned above, multiple instances of a particular value may be cached, each instance being stored according to a different format. When the particular value is a numeric value, at least one format may specify storing the numeric value as a native processing number, which is a hardware-level representation of the numeric value. As suggested by its name, a native processing number is stored according to a format that is suitable for native processing. In other words, a hardware-level representation of a numeric value is loadable into one or more registers to produce an arithmetically correct result by execution of a machine instruction.

Referring to FIG. 2, some example native processing numbers are provided. Decimal representations 100 are converted into hardware-level representations that are stored according to high-computation format (HCF) 200. HCF 200 is suitable for native processing, because mantissa 202 comprises a binary representation of the significant decimal digits that not only accounts for each significant decimal digit, but also accounts for the decimal place value of each significant decimal digit. For example, in HCF 200, the decimal digits of the number "123" would not be stored as the binary representations of one and twenty-three. Instead, the decimal number "123" would be stored as the binary representation of one hundred twenty-three. Advantageously, this enables mantissa 202 to be loaded directly into a CPU register for processing.

For efficient storage and/or processing of HCF data, mantissa 202 may be stored using a predetermined amount of data, such as a predetermined number of bytes. In the example of FIG. 2, each mantissa has a uniform length of eight bytes. Storing mantissa 202 using a predetermined amount of data enables HCF data to be stored in a compressed format that does not adversely affect processing times. This is because decompression can be performed relatively quickly when each mantissa value has a known length. Additionally or alternatively, storing mantissa 202 using a predetermined amount of data enables parallelization techniques, such as SIMD processing.

To store a set of mantissas using a predetermined amount of data, a common scale may be applied to each mantissa. Referring to FIG. 2, scale 204 is the same value of "−5" for each mantissa. The same scale value may be used for less than all of the values in a column. For example, a column of values may be stored using two or more column vectors, and each column vector can have a different scale value. This reduces the impact of certain column values, such as outliers and/or values that cannot be represented as native processing numbers without some loss of precision.

To illustrate, suppose that a column has one value with a scale of "−35" and nine values with a scale of "−10". If the ten column values are stored in a single column vector using a common scale value of "−35", nine of the column values will have significantly larger mantissas, thereby resulting in inefficient memory utilization. However, if the ten column values are stored using two column vectors that each store five column values, then the increase in space overhead can be approximately halved.

Similarly, suppose that, instead of the value with a scale of "−35", the column has one value that cannot be represented as a native processing number without some loss of precision. If the ten values are stored in a single column vector, then none of the values can be stored as HCF data. However, if the ten column values are stored using two column vectors that each store five column values, then HCF data can be stored for five column values. More specifically, HCF data can be stored for the five values having a scale of "−10".

For further efficiency in storage, instead of storing a common scale value multiple times for a set of mantissa values, the common scale value may be stored once for the set of mantissa values. In the example of FIG. 3, a common scale value is included in HCF metadata 302, which is stored in structure 300 as header data for HCF data stream 304. HCF metadata may also include a fixed length for each mantissa value, a minimum mantissa value, and/or a maximum mantissa value. For example, HCF metadata 302 also includes (a) an indication that each mantissa value is stored in HCF data stream 304 using eight bytes and (b) an indication that the maximum mantissa value stored in HCF data stream 304 is "101112131415161718". In some embodiments, the indication of the maximum mantissa value is a pointer to the maximum mantissa value.

As suggested by its name, HCF data enables efficient performance of high-computation operations, such as arithmetic operations. This is because storing HCF data involves decomposing a set of numeric values into (a) a set of mantissa values that can be processed natively and (b) a common scale value for each mantissa value. For example, addition can be performed on HCF data based on adding/aggregating mantissa values and thereafter applying a common scale value to the result. As another example, multiplication can be performed on HCF data based on multiplying mantissa values, adding scale values, and thereafter applying the sum of the scale values to the product of the mantissa values.

To avoid overflow when performing high-computation operations, the amount of memory to be allocated may be determined based on the minimum and/or maximum mantissa values. For example, when aggregating n mantissa values, the amount of memory to be allocated may be determined based on multiplying n with the maximum mantissa value. As another example, when multiplying pairs of mantissa values, the amount of memory to be allocated may be determined based on multiplying the maximum mantissa value with itself.

Multi-Format Data Storage

As mentioned above, the same data may be cached multiple times using different formats to enable efficient performance of operations involving varying degrees of computation. For example, to enable efficient performance of both low-computation operations and high-computation operations, each mantissa value of a set of mantissa values may be stored as both LCF data and HCF data. However, caching multiple instances of the same data utilizes an increased amount of memory. For example, caching each mantissa value of a set of mantissa values using two different formats can consume twice as much memory.

Figure 4:
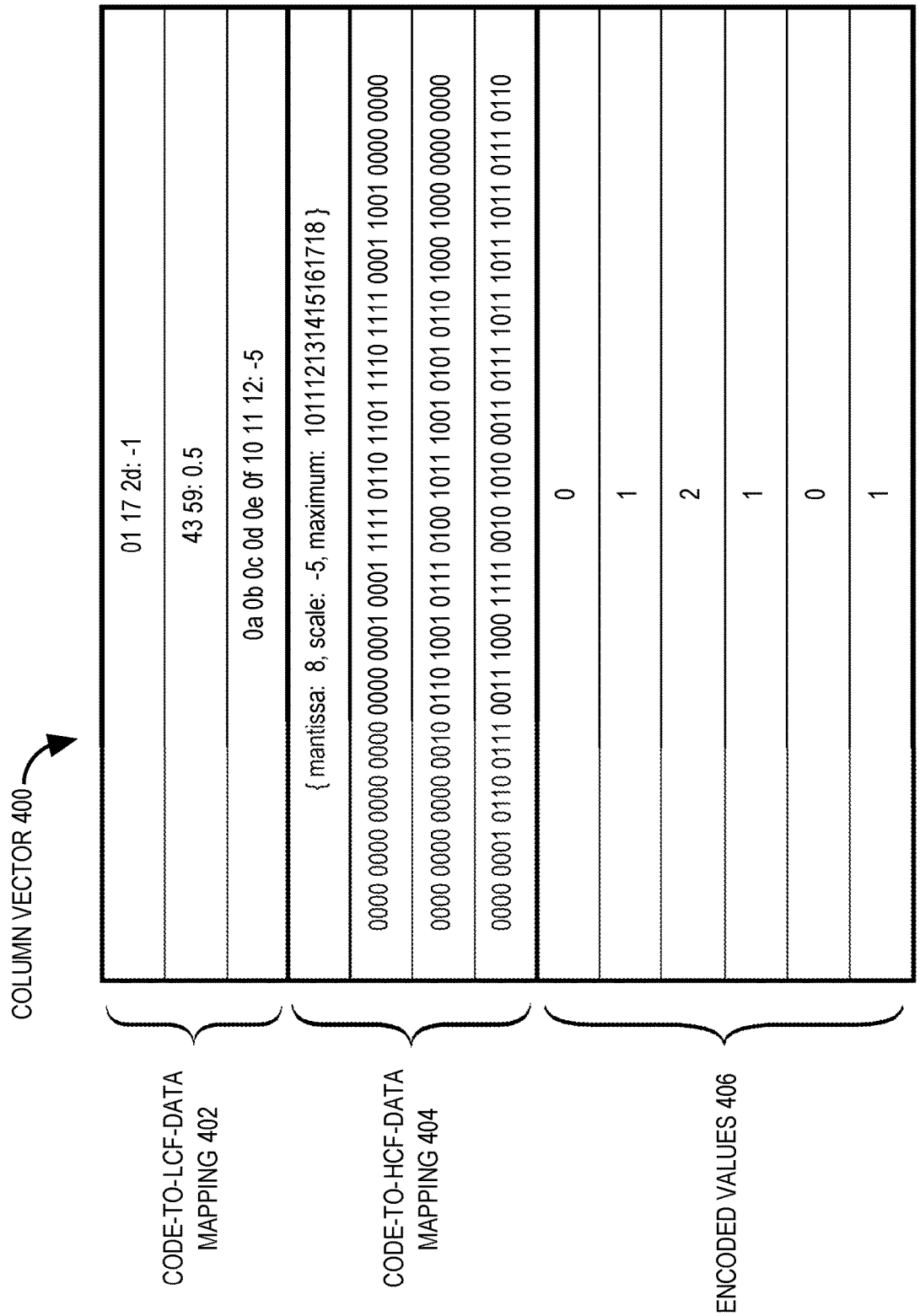
FIG. 4 depicts an example approach for storing data in multiple cache storage formats.

To minimize the increase in memory utilization, any number of various compression techniques may be leveraged. For example, FIG. 4 depicts a cached column vector 400 that efficiently stores both LCF data and HCF data based on leveraging dictionary encoding. Dictionary encoding is a lightweight compression technique that enables data to be represented by a smaller number of bits. The smaller number of bits corresponds to an encoded representation of the data and is hereinafter referred to as a "code". The data that is represented by the code is hereinafter referred to as a "token". Encoding and decoding are enabled based on maintaining one or more code dictionaries, which map tokens to codes and/or vice versa. Unless otherwise indicated, when it is said that a code dictionary is for/associated with/corresponds to a set of values, the code dictionary can be used to encode/decode the set of values.

Referring to FIG. 4, code-to-LCF-data mapping 402 is a code dictionary that maps the codes of encoded values 406 to the set of distinct tokens stored as LCF data. Each code of encoded values 406 corresponds to an index position of a respective token in mapping 402. For example, the numeric value "123.45" is stored at index position "0" in mapping 402 as the token "01 17 2d: −1"; thus, the numeric value "123.45" can be stored in encoded values 406 as the code "0". Advantageously, space savings is achieved based on storing the LCF representation of each distinct numeric value at most once in column vector 400.

Since LCF data can vary in length, in some embodiments, column vector 400 further comprises a structure for determining boundaries between tokens in mapping 402. An example of such a structure is the cumulative length array, which stores offsets corresponding to the boundaries.

Code-to-HCF-data mapping 404 is also a code dictionary. In some embodiments, structure 300 is stored in column vector 400 as mapping 404. Mapping 404 correlates the codes of encoded values 406 with the set of distinct tokens stored as HCF data. Each code of encoded values 406 corresponds to an index position of a respective mantissa value in mapping 404. Advantageously, space savings is achieved based on piggybacking the encodings of mapping 402. This enables storing the HCF representation of each distinct numeric value at most once in column vector 400.

Query Execution

Figure 5:
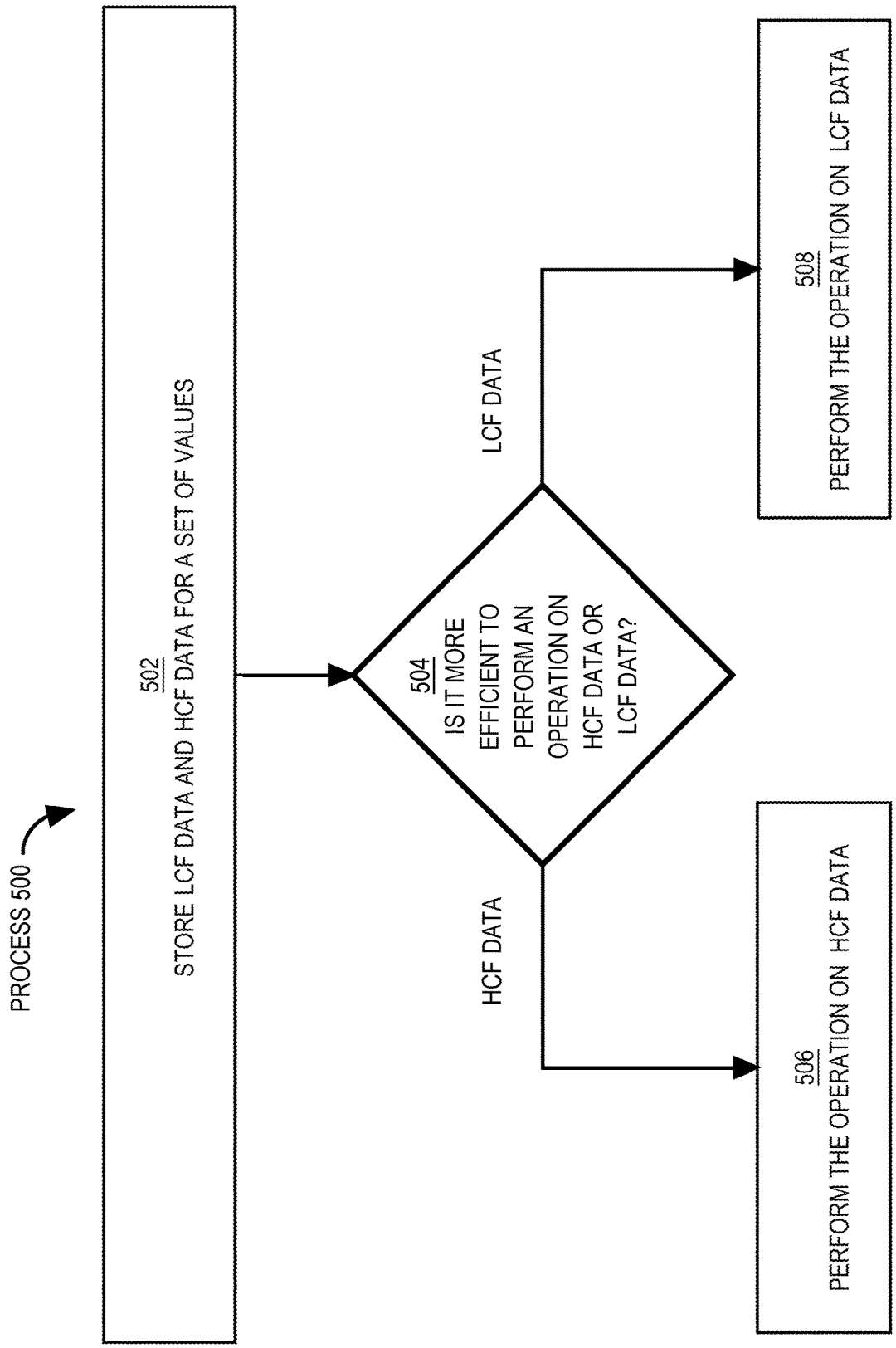
FIG. 5 is a flow diagram that depicts an example approach for determining which cache storage format is optimal for executing a particular query.

As mentioned above, storing the same data multiple times using different formats enables selecting, at runtime, the optimal format for performing a particular operation. Referring to FIG. 5, process 500 is an example approach for making this selection.

At block 502, both LCF data and HCF data are cached for a set of values. In some embodiments, each value in the set of values is distinct. For example, the LCF data may be the distinct tokens of a first code dictionary, and the HCF data may be the distinct tokens of a second code dictionary. Both the first code dictionary and the second code dictionary may be cached at a database server computer.

After block 502, the database server computer may receive a query to be executed over the set of values. Responsive to receiving the query, block 504 may be performed.

At block 504, a runtime decision is made as to whether it would be more efficient to perform a particular operation on LCF data or HCF data. The decision may be based on any number of various criteria including the type(s) of operation(s) involved in executing the query, column vector statistics, and/or feedback data. Each of these criteria is described in greater detail below. An example algorithm is also provided at the end of this section.

When the query is compiled, a determination can be made as to the type(s) of operation(s) involved in executing the query. For example, it can be determined whether executing the query involves performing a low-computation operation and/or a high-computation operation. Examples of low-computation operations include scan operations involving comparisons of numeric values and projection operations performed on column values in their entireties. Examples of high-computation operations include arithmetic operations performed on numeric values and predicate evaluation operations involving parsing column values into component parts. In general, it is more efficient to perform low-computation operations on LCF data, and it is more efficient to perform high-computation operations on HCF data.

Column vector statistics may include the cardinality of the column vector. As used herein, the cardinality of a column vector refers to the number of distinct values in the column vector. In some embodiments, cardinality information is included in metadata, such as HCF metadata 302. In general, it is more efficient to perform high-computation operations on HCF data at least when the column vector exhibits a relatively high cardinality. For example, suppose that the costs of performing an addition operation on a pair of HCF numbers and a pair of LCF numbers are one cost unit and three cost units, respectively. Thus, the cost of aggregating ten numbers that each appear only once in a column would be nine cost units if performed on HCF numbers and twenty-seven if performed on LCF numbers. However, in some cases, it can be just as efficient to perform high-computation operations on LCF data when the column vector exhibits a relatively low cardinality. For example, in addition to the example costs of the previous example, suppose that the cost of performing a multiplication operation on a LCF number is two cost units. Thus, the cost of aggregating three numbers that each appear five times in a column would be fourteen cost units if performed on HCF numbers but only twelve cost units if performed on LCF numbers based on aggregating the products of multiplying each LCF number to its frequency of appearance. What constitutes high/low cardinality may be determined in comparison to a threshold value that can be adjusted based on feedback data, which is described in greater detail at the end of this section.

If it is determined that it would be more efficient to perform the particular operation on HCF data, block 504 proceeds to block 506. Otherwise, block 504 proceeds to block 508. At block 506, the particular operation is performed on HCF data, and at block 508, the particular operation is performed on LCF data.

Feedback data may be used to determine whether the optimal format was selected. Examples of feedback data include an amount of time that elapsed during query execution and/or an indication of whether overflow occurred. Advantageously, if feedback data indicates that the optimal format was not selected, the remainder of the query execution process may proceed based on falling back to an alternative format.

An example algorithm for making the runtime decision depicted in FIG. 5 involves navigating, during query compilation, any query expressions to identify any operations that can be more efficiently evaluated on HCF data. Examples of such operations include aggregation operations, addition operations, subtraction operations, and multiplication operations. The example algorithm further involves navigating each argument of such operations to determine whether HCF data is available for all arguments. HCF data is determined to be available for an argument if one or more of the following conditions is satisfied:

values for the argument are supplied from column vectors that store HCF data;
the argument is a constant value; and
the argument is an operation having arguments that are recursively determined to have HCF data available.

Furthermore, the example algorithm may involve tracking the use of HCF data during query execution. Each column vector may store statistics indicating how many times HCF data was successfully used for arithmetic operations. Each column vector may also store how many times HCF data was unsuccessfully used for arithmetic operations, such as when HCF data is converted to LCF data on-the-fly or when performance of an arithmetic operation otherwise falls back dynamically to LCF data. If the number of times HCF data is unsuccessfully used for arithmetic operations is greater than the number of times HCF data is successfully used for arithmetic operations, further use of HCF data may be dynamically disabled.

Cache Maintenance

Figure 6:
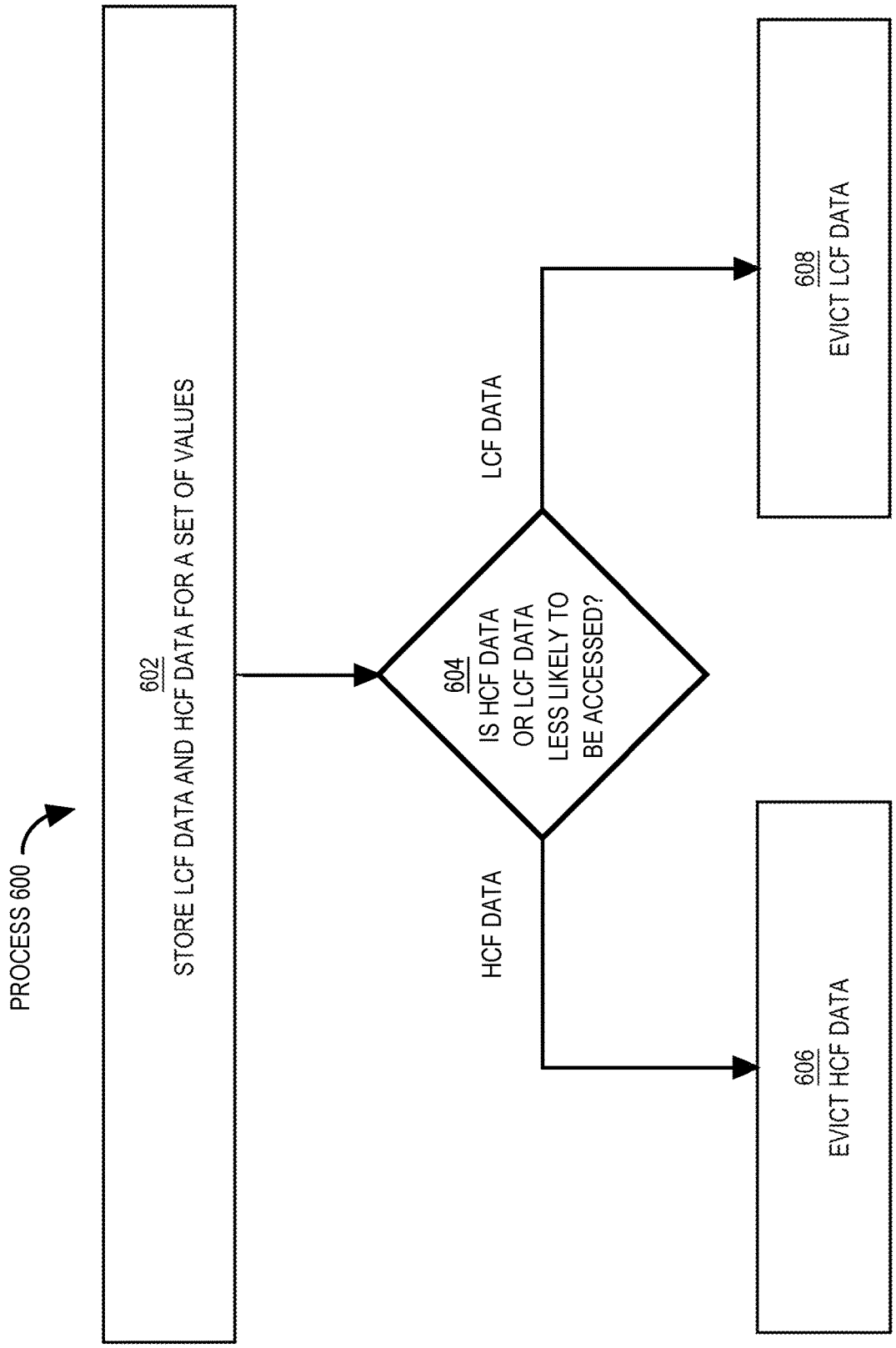
FIG. 6 is a flow diagram that depicts an example approach for determining which cache storage format to evict from a cache.

Periodically, a database system may free some cache memory. For example, when the cache is full/nearly full, it may be desirable to make space available for other data. If the same data is stored according to multiple formats, a good candidate for cache eviction is the data stored according to at least one format of the multiple formats. Referring to FIG. 6, process 600 is an example approach for making this decision at runtime.

At block 602, both LCF data and HCF data are cached for a set of values. Thus, the cache can be said to store duplicate sets of values albeit in different formats. As in block 502, in some embodiments, each value in the set of values is distinct.

At block 604, a runtime prediction is made as to whether the LCF data or the HCF data is less likely to be accessed when executing queries in the future. In other words, a runtime determination is made as to whether the LCF data or the HCF data is the colder/unused data. The prediction may be based on column vector statistics, feedback data, and/or access patterns. Furthermore, the prediction may be made on a per-column-vector basis.

Access patterns can be tracked based on maintaining metadata including a counter that is incremented each time data in a particular format is accessed. For example, each time a high-computation operation is performed on HCF data, an access counter for HCF data may be incremented; and each time a low-computation operation is performed on LCF data, an access counter for LCF data may be incremented. The counters for different formats may be compared to predict which format is less likely to be used in the future.

The prediction can be made in response to any number of various triggers. For example, the prediction may be triggered when a predetermined percentage of the cache has been utilized and/or whenever a predetermined amount of time has elapsed.

If it is predicted that future queries are less likely to be executed over HCF data, block 604 proceeds to block 606. Otherwise, block 604 proceeds to block 608. At block 606, HCF data is evicted from the cache, and at block 608, LCF data is evicted from the cache.

Variations

The techniques described above are not limited to numeric values. For example, a set of date and/or time values may be cached multiple times according to different formats. The different formats may include deconstructed representations of the set of values and non-deconstructed representations of the set of values.

To illustrate, a deconstructed representation of a date value may comprise component values (e.g., a month value, a day value, and/or a year value) that are stored separately. For example, a first column vector may be used to store month values, a second column vector may be used to store day values, and a third column vector may be used to store year values. In some embodiments, each column vector has its own code dictionary. Advantageously, the deconstructed representation enables efficient evaluation of query predicates. For example, responsive to a query for all the date values having a month component of "February", a scan operation may be limited to the twelve values of a code dictionary for the first column vector.

Similar techniques are applicable to deconstructed representations of time values, which may comprise an hours value, a minutes value, and/or a seconds value that are stored separately.

Although deconstructed representations of date and/or time values enable efficient performance of some operations, they can be suboptimal for performing other operations. In particular, performing a projection operation on deconstructed representations of date and/or time values can be time-consuming and computationally intensive, because it would involve stitching together component values. Thus, it can be advantageous to also cache non-deconstructed representations of the date and/or time values. A non-deconstructed representation of a date and/or time value is equivalent to a stitched-together version of a deconstructed representation. In other words, a non-deconstructed representation is a single value that can be decomposed into the component values of a deconstructed representation.

Runtime decisions as to whether it would be more efficient to execute a query over non-deconstructed representations or deconstructed representations can be made using any of the criteria mentioned above for determining whether it would be more efficient to execute a query over application-level representations or hardware-level representations. However, in the case of date and/or time values, high-computation operations and low-computation operations are distinguished based on whether or not a particular operation is performed on all or part of a date and/or time value. In other words, an example low-computation operation would involve scanning for a particular date and/or time value in its entirety, whereas an example high-computation operation would involve scanning for a particular component of a date and/or time value.

Runtime decisions regarding cache eviction can be made in a similar manner to those described above for numeric values.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
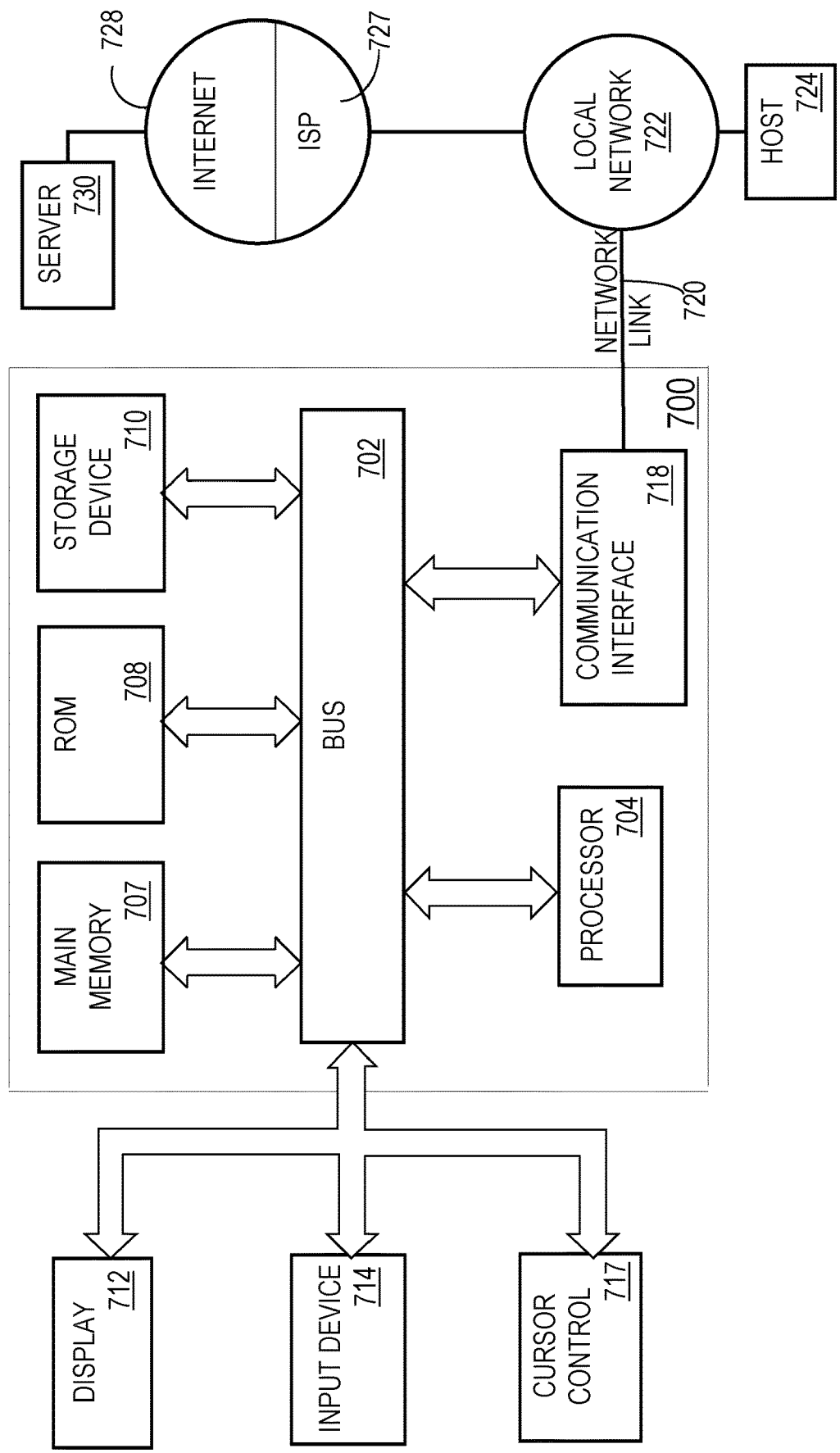
FIG. 7 depicts a computer system upon which embodiments may be implemented.

For example, FIG. 7 is a block diagram that illustrates a computer system 700 upon which an embodiment of the disclosure may be implemented. Computer system 700 includes a bus 702 or other communication mechanism for communicating information, and a hardware processor 704 coupled with bus 702 for processing information. Hardware processor 704 may be, for example, a general purpose microprocessor.

In some embodiments, co-processors may reside on the same chip as hardware processors or processor cores. Examples of such co-processors include a data analytics accelerator (DAX) co-processor and a single instruction, multiple data (SIMD) processor.

A DAX co-processor enables database operations to run directly in the co-processor while hardware processor cores execute other instructions. Such operations include (1) scanning an array for elements which match (or greater than or less than) an input value and returning a bit vector with bits set for matches; (2) selecting elements from an array based on a bit vector; and (3) in set operation, given an input set of integers, determining how many of them are also present in another set.

SIMD processors perform the same operation on multiple data items simultaneously. SIMD processors exploit data level parallelism by executing a single instruction against data in multiple registers or sub-registers. Thus, the throughput per instruction may be increased accordingly.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
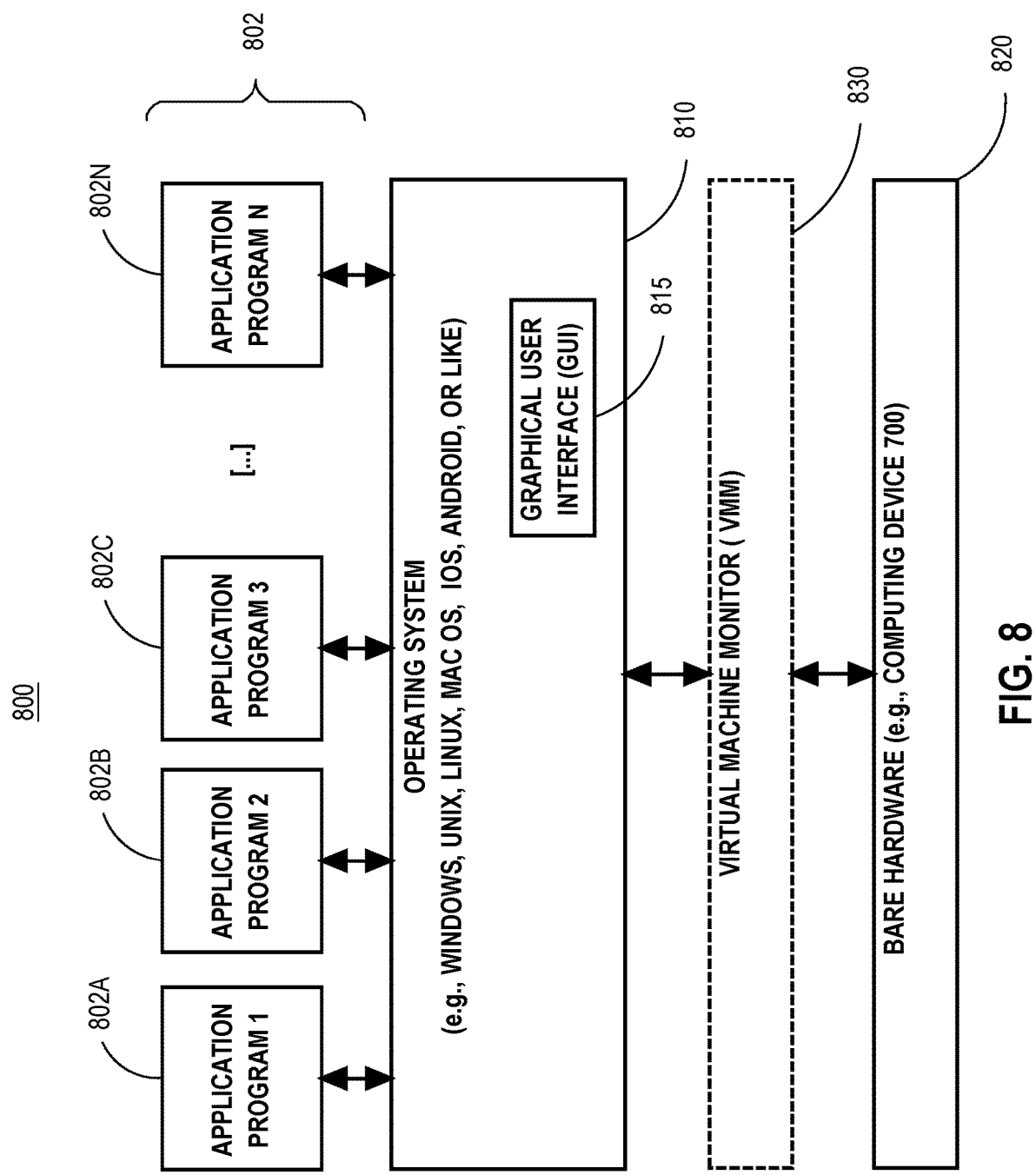
FIG. 8 depicts a software system for controlling the operation of the computer system.

FIG. 8 is a block diagram of a software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 700. The applications or other software intended for use on system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of system 800. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

EXTENSIONS AND ALTERNATIVES

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:

for each numeric value in a set of numeric values, storing, in a cache, a respective application-level representation that represents said each numeric value and a respective hardware-level representation that represents said each numeric value, wherein said respective application-level representation belongs to a set of application-level representations and said respective hardware-level representation belongs to a set of hardware-level representations, wherein each hardware-level representation of said set of hardware-level representations includes a value configured to be loadable into a register;

responsive to receiving a query to be executed over said set of numeric values, making a determination as to whether or not it would be more efficient to execute said query over said set of hardware-level representations than to execute said query over said set of application-level representations;

executing said query over said set of hardware-level representations when said determination indicates that it would be more efficient to execute said query over said set of hardware-level representations than to execute said query over said set of application-level representations;

wherein the method is performed by one or more computing devices.

2. The method of claim 1, further comprising:

executing said query over said set of application-level representations when said determination indicates that it would not be more efficient to execute said query over said set of hardware-level representations than to execute said query over said set of application-level representations.

3. The method of claim 1, further comprising:

making a prediction as to whether future queries are less likely to be executed over said set of application-level representations than to be executed over said set of hardware-level representations or whether future queries are less likely to be executed over said set of hardware-level representations than to be executed over said set of application-level representations;

evicting, from said cache, said set of application-level representations when said prediction indicates that said future queries are less likely to be executed over said set of application-level representations than to be executed over said set of hardware-level representations.

4. The method of claim 3, further comprising:
evicting, from said cache, said set of hardware-level representations when said prediction indicates that said future queries are less likely to be executed over said set of hardware-level representations than to be executed over said set of application-level representations.

5. The method of claim 1, wherein making said determination as to whether or not it would be more efficient to execute said query over said set of hardware-level representations than to execute said query over said set of application-level representations comprises:
determining that it would not be more efficient to execute said query over said set of hardware-level representations than to execute said query over said set of application-level representations when executing said query would not involve performing arithmetic operations on said set of numeric values.

6. The method of claim 1, wherein making said determination as to whether or not it would be more efficient to execute said query over said set of hardware-level representations than to execute said query over said set of application-level representations comprises:
determining that it would be more efficient to execute said query over said set of hardware-level representations than to execute said query over said set of application-level representations when said set of numeric values comprises a number of distinct values that exceeds a predetermined threshold.

7. The method of claim 1, wherein storing, in said cache, a respective application-level representation of said set of application-level representations and a respective hardware-level representation of said set of hardware-level representations comprises:
storing said set of numeric values as a set of encoded values;
storing a code-to-application-level-representation mapping that correlates each distinct encoded value of said set of encoded values to a respective application-level representation of said set of application-level representations;
storing a code-to-hardware-level-representation mapping that correlates each distinct encoded value of said set of encoded values to a respective hardware-level representation of said set of hardware-level representations.

8. A method comprising:
for each value of a set of values, storing, in a cache, a respective non-deconstructed representation that represents said each value and a respective deconstructed representation that represents said each value, wherein said each respective non-deconstructed representation belongs to a set of non-deconstructed representations, wherein said respective deconstructed representation belongs to a set of deconstructed representations, wherein each deconstructed representation of said set of deconstructed representations comprises a respective plurality of component values, wherein each component value of said respective plurality of component values is stored separately in a respective column vector in said cache; and
responsive to receiving a query to be executed over said set of values, making a determination as to whether or not it would be more efficient to execute said query over said set of deconstructed representations than to execute said query over said set of non-deconstructed representations;
executing said query over said set of deconstructed representations when said determination indicates that it would be more efficient to execute said query over said set of deconstructed representations than to execute said query over said set of non-deconstructed representations; and
wherein the method is performed by one or more computing devices.

9. The method of claim 8, further comprising:
executing said query over said set of non-deconstructed representations when said determination indicates that it would not be more efficient to execute said query over said set of deconstructed representations than to execute said query over said set of non-deconstructed representations.

10. The method of claim 8, wherein each value of said set of values is a date value, and wherein the respective plurality of component values of each deconstructed representation of said set of deconstructed representations comprises a month value, a day value, and a year value.

11. The method of claim 8, wherein each value of said set of values is a time value, and wherein the respective plurality of component values of each deconstructed representation of said set of deconstructed representations comprises an hours value and a minutes value.

12. The method of claim 8, further comprising:
making a prediction as to whether future queries are less likely to be executed over said set of non-deconstructed representations than to be executed over said set of deconstructed representations or whether future queries are less likely to be executed over said set of deconstructed representations than to be executed over said set of non-deconstructed representations;
evicting, from said cache, said set of non-deconstructed representations when said prediction indicates that said future queries are less likely to be executed over said set of non-deconstructed representations than to be executed over said set of deconstructed representations.

13. The method of claim 12, further comprising:
evicting, from said cache, said set of deconstructed representations when said prediction indicates that said future queries are less likely to be executed over said set of deconstructed than to be executed over said set of non-deconstructed representations.

14. The method of claim 8, wherein making said determination as to whether or not it would be more efficient to execute said query over said set of deconstructed representations than to execute said query over said set of non-deconstructed representations comprises:
determining that it would not be more efficient to execute said query over said set of deconstructed representations than to execute said query over said set of non-deconstructed representations when executing said query would not involve evaluating a query predicate over said set of values.

15. One or more non-transitory storage media storing one or more sequences of instructions, which, when executed by one or more computing devices, cause:
for each numeric value in a set of numeric values, storing, in a cache, a respective application-level representation that represents said each numeric value and a respective hardware-level representation that represents said each numeric value, wherein said respective application-level representation belongs to a set of application-level representations and said respective hardware-level representation belongs to a set of hardware-level representations, wherein each hardware-level representation of said set of hardware-level representations includes a value configured to be loadable into a register;

responsive to receiving a query to be executed over said set of numeric values, making a determination as to whether or not it would be more efficient to execute said query over said set of hardware-level representations than to execute said query over said set of application-level representations; and executing said query over said set of hardware-level representations when said determination indicates that it would be more efficient to execute said query over said set of hardware-level representations than to execute said query over said set of application-level representations.

16. The one or more non-transitory storage media of claim 15, wherein said one or more sequences of instructions further comprise instructions that, when executed by said one or more computing devices, cause:

executing said query over said set of application-level representations when said determination indicates that it would not be more efficient to execute said query over said set of hardware-level representations than to execute said query over said set of application-level representations.

17. The one or more non-transitory storage media of claim 15, wherein said one or more sequences further comprise instructions that, when executed by said one or more computing devices, cause:

making a prediction as to whether future queries are less likely to be executed over said set of application-level representations than to be executed over said set of hardware-level representations or whether future queries are less likely to be executed over said set of hardware-level representations than to be executed over said set of application-level representations;

evicting, from said cache, said set of application-level representations when said prediction indicates that said future queries are less likely to be executed over said set of application-level representations than to be executed over said set of hardware-level representations.

18. The one or more non-transitory storage media of claim 17, wherein said one or more sequences further comprise instructions that, when executed by said one or more computing devices, cause:

evicting, from said cache, said set of hardware-level representations when said prediction indicates that said future queries are less likely to be executed over said set of hardware-level representations than to be executed over said set of application-level representations.

19. The one or more non-transitory storage media of claim 15, wherein making said determination as to whether or not it would be more efficient to execute said query over said set of hardware-level representations than to execute said query over said set of application-level representations comprises:

determining that it would not be more efficient to execute said query over said set of hardware-level representations than to execute said query over said set of application-level representations when executing said query would not involve performing arithmetic operations on said set of numeric values.

20. The one or more non-transitory storage media of claim 15, wherein storing, in said cache, a respective application-level representation of said set of application-level representations and a respective hardware-level representation of said set of hardware-level representations comprises:

storing said set of numeric values as a set of encoded values;

storing a code-to-application-level-representation mapping that correlates each distinct encoded value of said set of encoded values to a respective application-level representation of said set of application-level representations;

storing a code-to-hardware-level-representation mapping that correlates each distinct encoded value of said set of encoded values to a respective hardware-level representation of said set of hardware-level representations.

21. The one or more non-transitory storage media of claim 15, wherein making said determination as to whether or not it would be more efficient to execute said query over said set of hardware-level representations than to execute said query over said set of application-level representations comprises:

determining that it would be more efficient to execute said query over said set of hardware-level representations than to execute said query over said set of application-level representations when said set of numeric values comprises a number of distinct values that exceeds a predetermined threshold.

22. One or more non-transitory storage media storing one or more sequences of instructions, which, when executed by one or more computing devices, cause:

for each value of a set of values, storing, in a cache, a respective non-deconstructed representation that represents said each value and a respective deconstructed representation that represents said each value, wherein said each respective non-deconstructed representation belongs to a set of non-deconstructed representations, wherein said respective deconstructed representation belongs to a set of deconstructed representations, wherein each deconstructed representation of said set of deconstructed representations comprises a respective plurality of component values, wherein each component value of said respective plurality of component values is stored separately in a respective column vector in said cache; and responsive to receiving a query to be executed over said set of values, making a determination as to whether or not it would be more efficient to execute said query over said set of deconstructed representations than to execute said query over said set of non-deconstructed representations;

executing said query over said set of deconstructed representations when said determination indicates that it would be more efficient to execute said query over said set of deconstructed representations than to execute said query over said set of non-deconstructed representations; and wherein the method is performed by one or more computing devices.

23. The one or more non-transitory storage media of claim 22, wherein the one or more sequences of instructions include instructions that, when executed by said one or more computing devices, cause:

executing said query over said set of non-deconstructed representations when said determination indicates that it would not be more efficient to execute said query over said set of deconstructed representations than to execute said query over said set of non-deconstructed representations.

24. The one or more non-transitory storage media of claim 22, wherein each value of said set of values is a date value, and wherein the respective plurality of component values of each deconstructed representation of said set of deconstructed representations comprises a month value, a day value, and a year value.

25. The one or more non-transitory storage media of claim, wherein each value of said set of values is a time value, and wherein the respective plurality of component values of each deconstructed representation of said set of deconstructed representations comprises an hours value and a minutes value.

26. The one or more non-transitory storage media of claim 22, wherein the one or more sequences of instructions include instructions that, when executed by said one or more computing devices cause:
   making a prediction as to whether future queries are less likely to be executed over said set of non-deconstructed representations than to be executed over said set of deconstructed representations or whether future queries are less likely to be executed over said set of deconstructed representations than to be executed over said set of non-deconstructed representations;
   evicting, from said cache, said set of non-deconstructed representations when said prediction indicates that said future queries are less likely to be executed over said set of non-deconstructed representations than to be executed over said set of deconstructed representations.

27. The one or more non-transitory storage media of claim 26, wherein the one or more sequences of instructions include instructions that, when executed by said one or more computing devices, cause:
   evicting, from said cache, said set of deconstructed representations when said prediction indicates that said future queries are less likely to be executed over said set of deconstructed than to be executed over said set of non-deconstructed representations.

28. The one or more non-transitory storage media of claim 22, wherein making said determination as to whether or not it would be more efficient to execute said query over said set of deconstructed representations than to execute said query over said set of non-deconstructed representations comprises:
   determining that it would not be more efficient to execute said query over said set of deconstructed representations than to execute said query over said set of non-deconstructed representations when executing said query would not involve evaluating a query predicate over said set of values.

\* \* \* \* \*

UNITED STATES PATENT AND TRADEMARK OFFICE
CERTIFICATE OF CORRECTION

| | | |
|---|---|---|
| PATENT NO. | : 12,093,261 B2 | Page 1 of 1 |
| APPLICATION NO. | : 15/943335 | |
| DATED | : September 17, 2024 | |
| INVENTOR(S) | : Mishra et al. | |

It is certified that error appears in the above-identified patent and that said Letters Patent is hereby corrected as shown below:

On the Title Page

On page 2, Column 2, under item [56] other publications, Line 25, delete "Decmeber" and insert -- December --, therefor.

In the Claims

In Column 19, Line 8, in Claim 25, delete "claim," and insert -- claim 22, --, therefor.

In Column 19, Line 16, in Claim 26, delete "devices" and insert -- devices, --, therefor.

Signed and Sealed this
Seventh Day of January, 2025

Derrick Brent
*Acting Director of the United States Patent and Trademark Office*